US009719865B2

(12) United States Patent
Chainer et al.

(10) Patent No.: US 9,719,865 B2
(45) Date of Patent: Aug. 1, 2017

(54) THERMALLY DETERMINING FLOW AND/OR HEAT LOAD DISTRIBUTION IN PARALLEL PATHS

(71) Applicant: International Business Machines Corporation, Armonk, NY (US)

(72) Inventors: Timothy J. Chainer, Putnam Valley, NY (US); Madhusudan K. Iyengar, Woodstock, NY (US); Pritish R. Parida, Fishkill, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1072 days.

(21) Appl. No.: 13/687,779

(22) Filed: Nov. 28, 2012

(65) Prior Publication Data
US 2014/0146845 A1 May 29, 2014

(51) Int. Cl.
*G01K 15/00* (2006.01)
*G01K 7/42* (2006.01)
(Continued)

(52) U.S. Cl.
CPC ........... *G01K 15/005* (2013.01); *G01K 7/427* (2013.01); *G01J 5/0003* (2013.01); *G01J 5/522* (2013.01);
(Continued)

(58) Field of Classification Search
CPC ...... G01K 15/00; G01K 15/005; G01K 7/427; G01K 2007/422; G01J 5/522; G01J 5/0003; G01F 2200/201
(Continued)

(56) References Cited

U.S. PATENT DOCUMENTS 4,574,870 A * 3/1986 Weitman ............. F28D 21/0012
165/292
2003/0139894 A1* 7/2003 Ryan ...................... G01K 17/12
702/132
(Continued)

FOREIGN PATENT DOCUMENTS

GB 2467805 A 8/2010
WO WO2012003895 A1 1/2012

OTHER PUBLICATIONS

Christy Sujatha.D et al, "Energy Efficient Free Cooling System for Data Centers", Nov. 29, 2011 Third IEEE International Conference on Coud Computing Technology and Science.
(Continued)

*Primary Examiner* — Lisa Caputo
*Assistant Examiner* — Nathaniel T Woodward
(74) *Attorney, Agent, or Firm* — Daniel P. Morris; Otterstedt, Ellenbogen & Kammer, LLP

(57) ABSTRACT

A method including obtaining calibration data for at least one sub-component in a heat transfer assembly, wherein the calibration data comprises at least one indication of coolant flow rate through the sub-component for a given surface temperature delta of the sub-component and a given heat load into said sub-component, determining a measured heat load into the sub-component, determining a measured surface temperature delta of the sub-component, and determining a coolant flow distribution in a first flow path comprising the sub-component from the calibration data according to the measured heat load and the measured surface temperature delta of the sub-component.

12 Claims, 6 Drawing Sheets

(51) Int. Cl.
*G01J 5/52* (2006.01)
*G01J 5/00* (2006.01)

(52) U.S. Cl.
CPC ....... *G01K 15/00* (2013.01); *G01K 2007/422* (2013.01); *G06F 2200/201* (2013.01)

(58) Field of Classification Search
USPC ............ 374/1, 29, 30, 43, 137, 44; 165/293; 702/132, 99
See application file for complete search history.

(56) References Cited

U.S. PATENT DOCUMENTS

| | | |
|---|---|---|
| 2004/0264124 A1 | 12/2004 | Patel et al. |
| 2007/0070600 A1 | 3/2007 | Tomioka et al. |
| 2009/0259343 A1 | 10/2009 | Rasmussen et al. |
| 2010/0314094 A1* | 12/2010 | Hall ....................... G05D 23/19 165/293 |
| 2011/0301911 A1 | 12/2011 | VanGilder et al. |

OTHER PUBLICATIONS

Timothy J. Chainer et al. unpublished U.S. Appl. No. 14/982,623, filed Dec. 29, 2015, pp. 1-22 plus 6 sheets drawings.

* cited by examiner

THERMALLY DETERMINING FLOW AND/OR HEAT LOAD DISTRIBUTION IN PARALLEL PATHS

This invention was made with Government support under Contract No.: DE-EE0002894 (awarded by Department of Energy (DOE)). The Government has certain rights in this invention.

BACKGROUND

This disclosure relates to the thermodynamic arts, and more particularly, to fluid flow and/or heat transfer determination in cooling systems.

Liquid cooling is one method of cooling computer equipment in high performance environments such as server farms. The liquid coolant may be used to cool components through the use of cold plates, cold rails, or the like, which are disposed in thermal communication with the components, such as a processor or one or more Dual Inline Memory Modules (DIMMs).

BRIEF SUMMARY

According to an exemplary embodiment of the present disclosure, a method includes obtaining calibration data for at least one sub-component in a heat transfer assembly, wherein the calibration data comprises at least one indication of coolant flow rate through the sub-component for a given surface temperature delta of the sub-component and a given heat load of the sub-component, determining a measured heat load into the sub-component, determining a measured surface temperature delta of the sub-component, and determining a coolant flow distribution in a first flow path comprising the sub-component from the calibration data according to the measured heat load and the measured surface temperature delta of the sub-component.

According to an exemplary embodiment of the present disclosure, a method includes selecting a sub-component, disposing the sub-component in a flow path, recording, simultaneously, a plurality of parameters of the sub-component disposed in the flow path, wherein the plurality of parameters include a heat load applied to a sub-component, a surface temperature delta of the sub-component, and a flow rate of a coolant through the flow path, and generating calibration data based on the plurality of parameters of the sub-component, the calibration data configured to return an indication of coolant flow distribution through the sub-component for a given surface temperature delta of the sub-component and a given heat load of the sub-component.

According to an exemplary embodiment of the present disclosure, a method includes obtaining calibration data for a plurality of sub-components in a heat transfer assembly, wherein the calibration data comprises at least one indication of coolant flow rate through each of the plurality of sub-components for a given surface temperature delta of each of the plurality of sub-components and a given heat load into each of the plurality of sub-components, receiving coolant flow distribution data in the heat transfer assembly for respective flow paths, each path including at least one of the plurality of sub-components, determining a measured surface temperature delta of each of the plurality of sub-components, determining a system level coolant flow rate for the heat transfer assembly, and determining a heat load distribution in the heat transfer assembly between each of the respective flow paths according to the calibration data, the coolant flow distribution, and the measured surface temperature delta of each of the plurality of sub-components.

According to an embodiment of the present disclosure, a computer program product for determining a coolant flow rate in a heat transfer assembly comprises a computer readable storage medium having computer readable program code embodied therewith, the computer readable program code comprising computer readable program code configured to perform the determination of the coolant flow rate.

BRIEF DESCRIPTION OF THE SEVERAL VIEWS OF THE DRAWINGS

Preferred embodiments of the present disclosure will be described below in more detail, with reference to the accompanying drawings.

DETAILED DESCRIPTION

Disclosed is a system of thermally determining flow distribution and/or heat load distribution among parallel flow and/or heat transfer paths in cooling assemblies.

Figure 1:
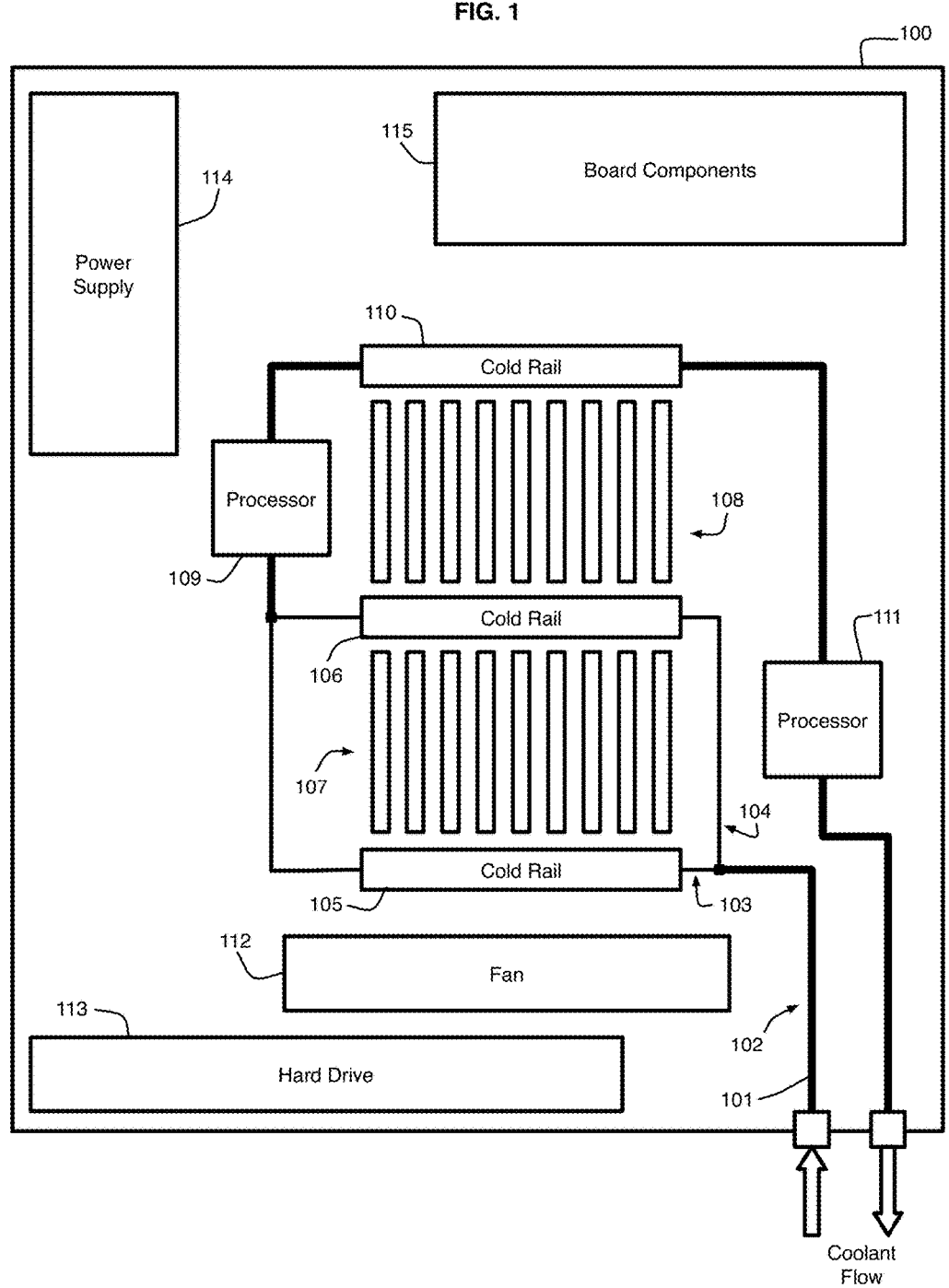
FIG. 1 is a block diagram depicting an exemplary parallel flow path for a liquid coolant in a hybrid air/liquid cooled computer system according to an embodiment of the present disclosure.

Referring to FIG. 1, FIG. 1 is a block diagram of a liquid cooled server 100 including two processors and two banks for memory modules. Within the liquid cooled server 100, a heat transfer assembly 101 includes a coolant flow path 102 (e.g., copper tubing). The coolant, e.g., water, enters from a first side of the partially liquid cooled server, wherein the coolant flow path bifurcates into two parallel flow paths 103 and 104 passing through a first cold rail 105 and a second cold rail 106 and cooling a first bank of (Dual Inline Memory Modules) DIMMs 107 and partially cooling a second bank of DIMMs 108. The two parallel flow paths 103 and 104 then recombine and pass through a first cold plate structure connected to processor 109, continuing through a third cold rail 110, and then through a second cold plate structure connected to processor 111. The DIMMs can be connected to a pair of conduction spreaders (not shown), which are then bolted to the respective cold rails 105 and 106, which have coolant flowing there-through.

The liquid cooled server 100 may include various other components, such as one or more fans 112 providing additional cooling, one or more hard drives 113, a power supply module 114, and board components 115. One of ordinary skill in the art would appreciate that a system according to an exemplary embodiment of the present disclosure is not limited to the components described here. That is, the described components are not intended to limit the scope of the present disclosure.

Embodiments of the present disclosure will be described in terms of the first cold rail comprising a 3.175 millimeter round copper tube that has been flattened and the second cold rail comprising a 3.175 millimeter round copper tube. It should be understood that different sub-components of the heat transfer assembly can have different dimensions and that the present disclosure is not intended to be limited to any specific dimension described herein.

According to an embodiment of the present disclosure, it can be determined whether the copper tube of the first cold rail 105 is sufficiently open to have any coolant flow through it, and if so, the flow rate of the coolant through the copper tube can be determined. That is, a flow distribution among the two parallel flow paths 103 and 104 can be determined.

According to an embodiment of the present disclosure, given the flow rate, an amount of heat that flows into each of the parallel flow paths 103 and 104 from the first bank of DIMMs 107 and the second bank of DIMMs 108 can be determined.

Figure 2:
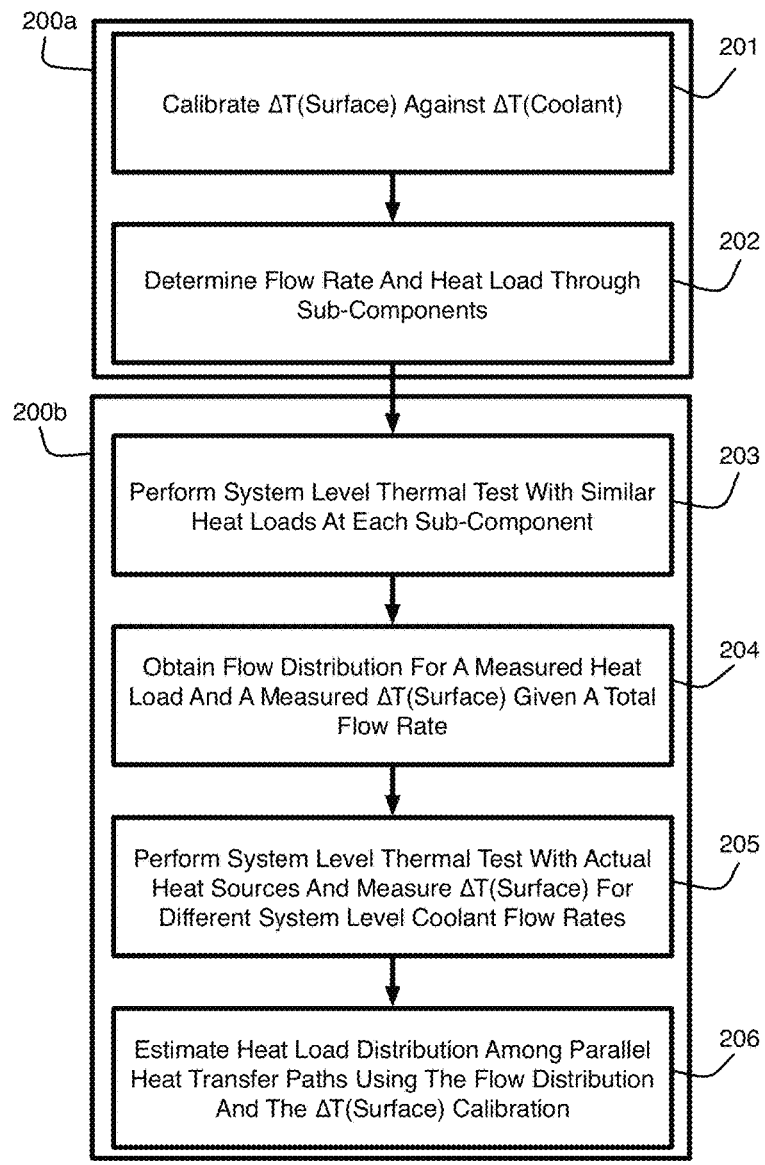
FIG. 2 is a flow diagram of a method for determining a flow distribution and heat load distribution among parallel flow and heat transfer paths according to an embodiment of the present disclosure.

Referring now to FIG. 2, an exemplary method for determining a flow distribution and heat load distribution among parallel flow and heat transfer paths. The exemplary method includes a calibration phase 200a and an implementation phase 200b. It should be understood that the blocks included in the calibration phase 200a are performed for individual sub-components and the blocks included in the implementation phase 200b are performed for a heat transfer assembly including at least one sub-component.

The exemplary method of FIG. 2 includes calibrating a temperature delta across a surface of each sub-component, $\Delta T(\text{Surface})$, against a temperature delta in the coolant temperature across the sub-component, $\Delta T(\text{Coolant})$, for different coolant flow rates and for different heat loads at block 201. The calibration is done for all sub-components (e.g., cold plates, cold rails, etc.). Note that the flow rate and the heat load are known during calibration. That is, the flow rate can be measured by, for example, a flow meter. The heat load used during the calibration can be generated by an actual heat source or a dummy heat source, e.g., a Polyimide heater, a cartridge heater, and the like, wherein voltage and current can be measured, and watts dissipated can be determined. The dummy heat source can also include a yttrium aluminum garnet (YAG) laser, whose output, Q, can be measured. Further, according to an exemplary embodiment of the present disclosure, a similar heat load is applied to each sub-component during calibration. It should be understood that an accuracy of the calibration can be related to the similarity of the heat loads applied to different components during calibration. At least in view of the foregoing, one or ordinary skill in the art would appreciate how the similarity of the heat loads can affect the accuracy of the calibration, and a calibration system, including a heat source, can be designed accordingly.

From the calibration, the relationship of flow rate, heat load, coolant temperature differential, and surface temperature differential for each sub-component may be determined at block 202, for example as follows:

$$\Delta T(\text{Surface}) = g(Q, V, \Delta T(\text{Coolant})) = h(Q, V),$$

where g, h are functions and Q is heat load applied to and V is the volumetric flow rate through the sub-component (since the mass flow rate is the volumetric flow rate times the density, the correlation can also be obtained in terms of mass flow rate).

For example, $\Delta T(\text{Surface}) = g(Q, V, \Delta T(\text{Coolant})) = a^*(\Delta T(\text{Coolant})^b * (V/Q)^{(b-1)}$ where a and b are constants. In one non-limiting example, constant a is determined to be 2 and constant b is determined to be 1.5. Other values of constants a and b can be set or determined by one of ordinary skill in the art in view of the present disclosure.

Since, $\Delta T(\text{Coolant}) = Q/\rho \cdot V \cdot C_p$, Thus, $\Delta T(\text{Surface}) = a^*(\Delta T(\text{Coolant}))^b * (V/Q)^{(b-1)} = a^*(Q/\rho \cdot V \cdot C_p)^b * (V/Q)^{(b-1)} = a^*(1/\rho \cdot C_p)^b * (Q/V) = h(Q, V)$, where $\rho$ is density and $C_p$ the specific heat capacity.

According to FIG. 2, an implementation phase 200b can be performed on a heat transfer assembly including one or more sub-components calibrated in the calibration phase 200a. At block 203, system level thermal tests are performed with similar heat loads at individual sub-components and the $\Delta T(\text{Surface})$ for different system-level coolant flow rates is measured.

At block 204, the $\Delta T(\text{Surface})$ calibration is used to obtain flow distribution V for each branch of the heat transfer assembly, since the heat load Q, functional form h, and $\Delta T(\text{Surface})$ are known.

At block 205, system level thermal tests with actual heat sources are performed and the $\Delta T(\text{Surface})$ for different system-level (e.g., total) coolant flow rates is measured.

The flow distribution obtained at block 204 and the $\Delta T(\text{Surface})$ calibration are used to estimate the heat load distribution among the parallel heat transfer paths at block 206.

For the remainder of the detailed description and in the figures, the following terms will be used:

$\Delta T_S = \Delta T(\text{Surface}) =$ temperature delta across the subcomponent surface $\Delta T_C = \Delta T(\text{Coolant}) =$ temperature delta in the coolant temperature across the sub-component $T_{C1} =$ Coolant temperature upstream of the sub-component $T_{C2} =$ Coolant temperature downstream of the sub-component $T_{S1} =$ Surface temperature upstream of the sub-component $T_{S2} =$ Surface temperature downstream of the sub-component $T_{C1,n} =$ Coolant temperature upstream of the sub-component n $T_{C2,n} =$ Coolant temperature downstream of the sub-component n $T_{S1,n} =$ Surface temperature upstream of the sub-component n $T_{S2,n} =$ Surface temperature downstream of the sub-component n f, g and h are functions wherein, $$f = (Q/\rho \cdot V \cdot C_p);$$

$$g = a^*(\Delta T(\text{Coolant})^b * (V/Q)^{(b-1)},$$

which describes a power-law function, wherein constants a and b can be determined by fitting this expression to the calibration data; and $$h = a^*(1/\rho \cdot C_p)^b * (Q/V),$$

and further wherein, a and b are the same or different constants, e.g., 2, 0.2, 7, 10, etc.

Q = heat load

V=volumetric flow rate through the sub-component
ρ=Coolant density
$C_p$=Specific heat capacity of the coolant
$Q_{2\_1}$=heat load into a sub-component, 2, in the heat transfer assembly from a first side, 1
$Q_{2\_2}$=heat load into the sub-component, 2, in the heat transfer assembly from a second side, 2

Hereinafter, an exemplary method is described for thermally determining the flow distribution and heat load distribution among parallel flow and heat transfer paths in cooling assemblies with specific reference to FIGS. 3-6.

Figure 3:
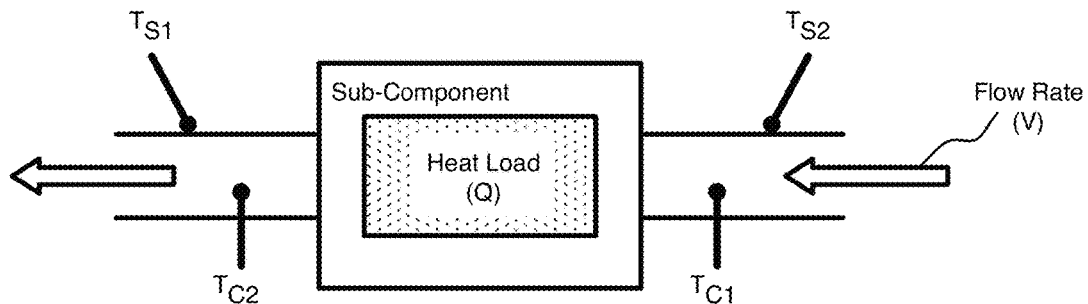
FIG. 3 schematically shows the calibration of a sub-component according to an embodiment of the present disclosure.

FIG. 3 schematically shows an exemplary calibration of a sub-component (see also block 201, FIG. 2). An energy balance across each sub-component can be performed to obtain/represent the temperature delta in the coolant temperature across the sub-component as a function of heat load (Q) and coolant flow rate (V). More particularly, the heat load (Q) may be expressed as:

$$Q = \rho \cdot V \cdot C_p \cdot \Delta T_C = \rho \cdot V \cdot C_p \cdot (T_{C2} - T_{C1}).$$

Thus, $\Delta T_C = f(Q, V)$. That is $\Delta T_C$ can be represented as a function of heat load (Q) and coolant flow rate (V).

The calibration can be performed for different heat load (Q) and different coolant flow rate (V). For all these cases, the temperature delta across the sub-component surface ($\Delta T_S$) is collected and is used to calibrate against the temperature delta in the coolant temperature across the sub-component ($\Delta T_C$). Using this calibration, the temperature delta across the subcomponent surface can be represented as a function of heat load (Q) and coolant flow rate (V). That is, the calibration at block 201 may be expressed as:

$$\Delta T_S = g(\Delta T_C) = g(f(Q,V)) = h(Q,V)$$

That is, after calibration $\Delta T_S$ can be represented as a function of Heat Load (Q) and Coolant Flow Rate (V). This can be done for all the different sub-components.

Figure 4:
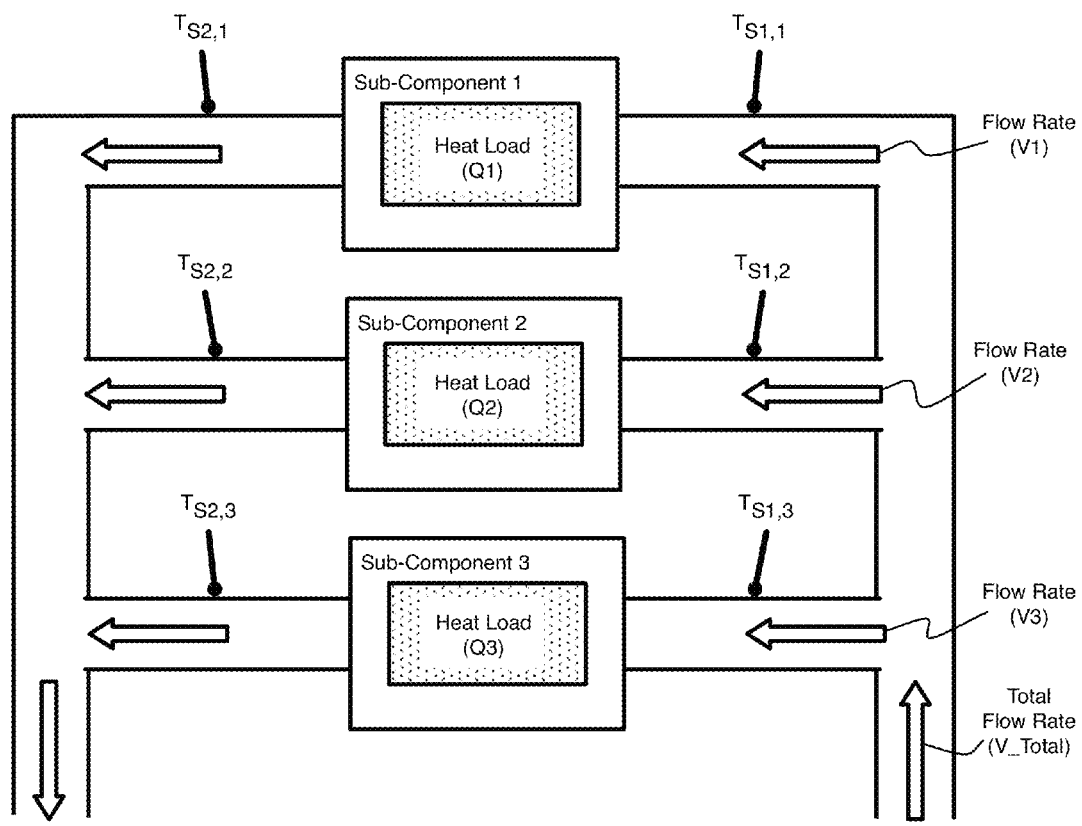
FIG. 4 schematically represents the estimation of the flow distribution according to an embodiment of the present disclosure.

FIG. 4 schematically represents exemplary estimation of the flow distribution (see block 204, FIG. 2) obtained from the temperature delta calibration (see block 203, FIG. 2). More particularly, at block 203, system level thermal tests can be performed with similar heat loads at individual sub-components and the $\Delta T_S$ for different system-level coolant flow rates is measured. The $\Delta T_S$ calibration is used to obtain flow distribution for a given total flow rate through the heat transfer assembly. More particularly, according to an illustrative embodiment of the present disclosure, the flow rate V1 in FIG. 4 can be determined using $T_{S1,1}$, $T_{S2,1}$ and Q1, the flow rate V2 can be determined using $T_{S1,2}$, $T_{S2,2}$ and Q2 and flow rate V3 can be determined using $T_{S1,3}$, $T_{S2,3}$ and Q3.

Figure 5:
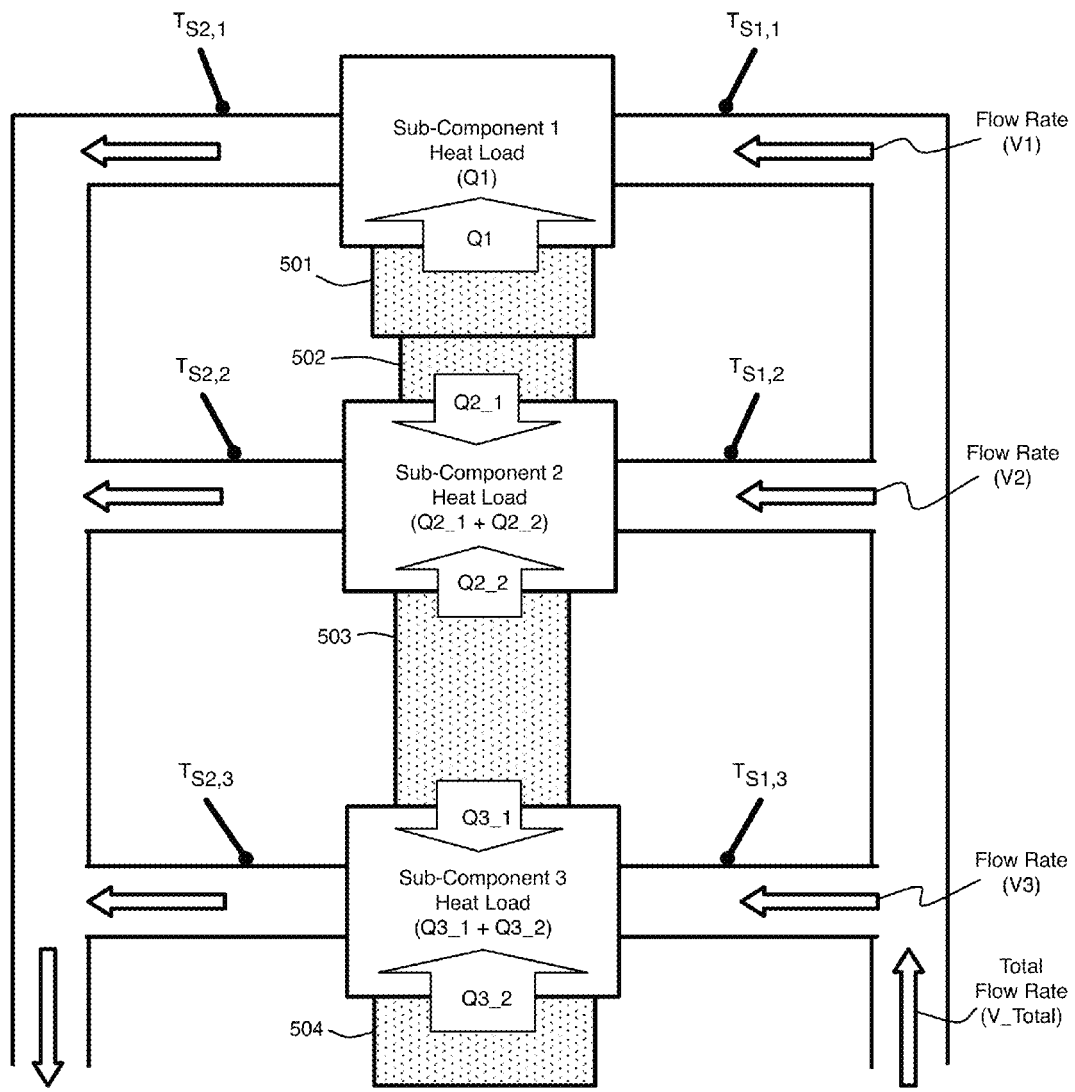
FIG. 5 schematically represents the system level thermal test with similar heat loads at each sub-component according to an embodiment of the present disclosure.

FIG. 5 schematically represents an exemplary system level thermal test (see block 205, FIG. 2) to estimate the heat load distribution. Heat sources 501-504 are shown disposed between sub-components. System level thermal tests with actual heat loads, Q1, Q2_1, Q2_2, Q3_1 and Q3_2, imparted by the heat sources 501-504 are performed, and $\Delta T_S$ is measured over different system level coolant flow rates. The flow distribution and the $\Delta T_S$ calibration, determined previously, can be used to estimate the heat load distribution among the parallel heat transfer paths (see block 206, FIG. 2).

It should be understood the temperature may be measured using various methods and devices. In an illustrative example, thermocouples may be used to measure the surface temperature of an inlet and an output of a cold rail, the inlet and output water temperature of the cold rail, and so on.

More generally, a first surface temperature is measured at a first location and a second surface temperature is measured at a second location, different than the first location, along a flow path of the sub-component. Heat dissipations in step 203 can be determined using electrical power dissipation calculations, based on measured voltages and currents, for example.

Figure 6:
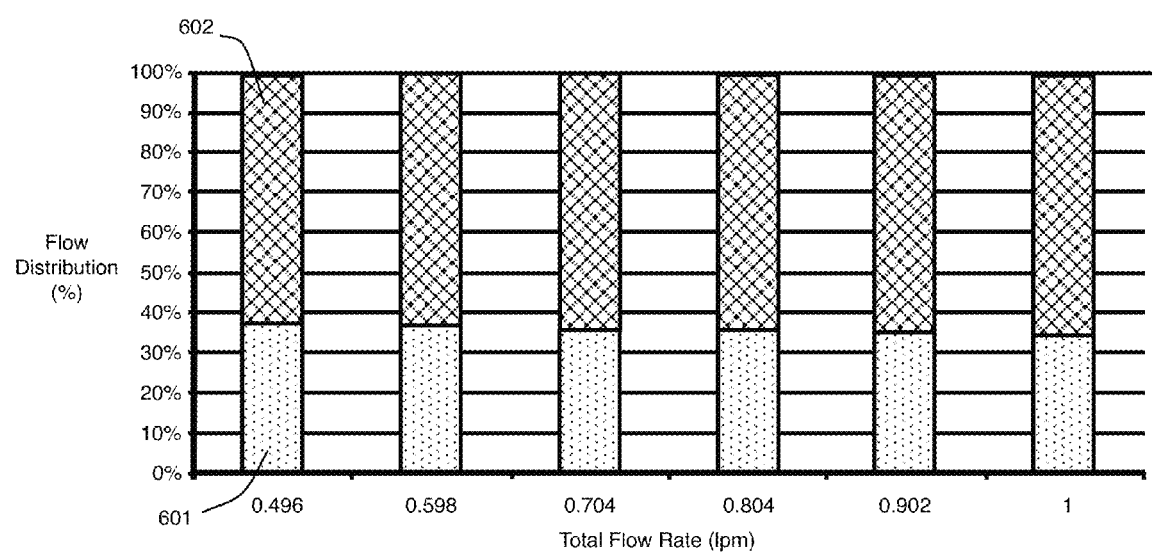
FIG. 6 is a graph illustrating a flow rate distribution between the parallel flow paths according to an embodiment of the present disclosure.

FIG. 6 is a graph illustrating a flow rate distribution between the parallel flow paths 103 and 104 in FIG. 1. That is, FIG. 6 shows a first flow distribution, e.g., 601, corresponding to the flow path 103 and a second flow distribution, e.g., 602, corresponding to the flow path 104, for different total flow rates, given in liters per minute (lpm). The flow distributions are given as a percentage of the total flow rate.

It should be understood that the methodologies of embodiments of the disclosure may be particularly well-suited for monitoring a heat transfer assembly, for example, to detect blockages during manufacturing or in-situ in a computer system. In a further exemplary implementation, the methodologies of embodiments of the disclosure may be used for comparing the efficiencies of different cooling assemblies during periods of high demand. In yet another exemplary implementation, coolant flow to different parallel paths may be adjusted according to heat load distribution by, for example, a valve disposed in the heat transfer assembly or the like.

Further, it should be understood that the methodologies of embodiments of the disclosure may be particularly well-suited for use in any system having parallel flow paths that are thermally coupled to multiple heat sources, cooling structures or the like. That is, embodiments of the present disclosure are not limited to the cooling of computer equipment. Further implementations may include flow paths within internal combustion engines, nuclear power plant installations, solar water heating systems, and the like.

Given the discussion thus far, it will be appreciated that, in general terms, an exemplary method, according to an aspect of the invention, includes obtaining calibration data, at block 200a, for at least one sub-component in a heat transfer assembly, wherein the calibration data comprises at least one indication of coolant flow rate through the sub-component for a given surface temperature delta of the sub-component and a given heat load of the sub-component, determining a measured heat load into the sub-component (see block 203), determining a measured surface temperature delta of the sub-component (see block 203), and determining a coolant flow distribution, at block 204, in a first flow path comprising the sub-component from the calibration data according to the measured heat load and the measured surface temperature delta of the sub-component.

According to an exemplary embodiment of the present disclosure, a method includes selecting a sub-component, disposing the sub-component in a flow path, recording, simultaneously, a plurality of parameters of the sub-component disposed in the flow path, wherein the plurality of parameters include a heat load applied to a sub-component, a surface temperature delta of the sub-component, and a flow rate of a coolant through the flow path, and generating calibration data based on the plurality of parameters of the sub-component, the calibration data configured to return an indication of coolant flow distribution through the sub-component for a given surface temperature delta of the sub-component and a given heat load of the sub-component.

According to an exemplary embodiment of the present disclosure, a method includes obtaining calibration data for a plurality of sub-components in a heat transfer assembly, wherein the calibration data comprises at least one indication of coolant flow rate through each of the plurality of sub-components for a given surface temperature delta of each of the plurality of sub-components and a given heat load into each of the plurality of sub-components, receiving coolant flow distribution data in the heat transfer assembly for respective flow paths, each path including at least one of the plurality of sub-components, determining a measured surface temperature delta of each of the plurality of sub-components, determining a system level coolant flow rate for the heat transfer assembly, and determining a heat load distribution in the heat transfer assembly between each of the respective flow paths according to the calibration data, the coolant flow distribution, and the measured surface temperature delta of each of the plurality of sub-components.

The methodologies of embodiments of the disclosure may be particularly well-suited for use in an electronic device or alternative system. Accordingly, embodiments of the present disclosure may take the form of an entirely hardware embodiment or an embodiment combining software and hardware aspects that may all generally be referred to herein as a "processor", "circuit," "module" or "system." Furthermore, embodiments of the present disclosure may take the form of a computer program product embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments of the present disclosure are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions.

These computer program instructions may be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Figure 7:
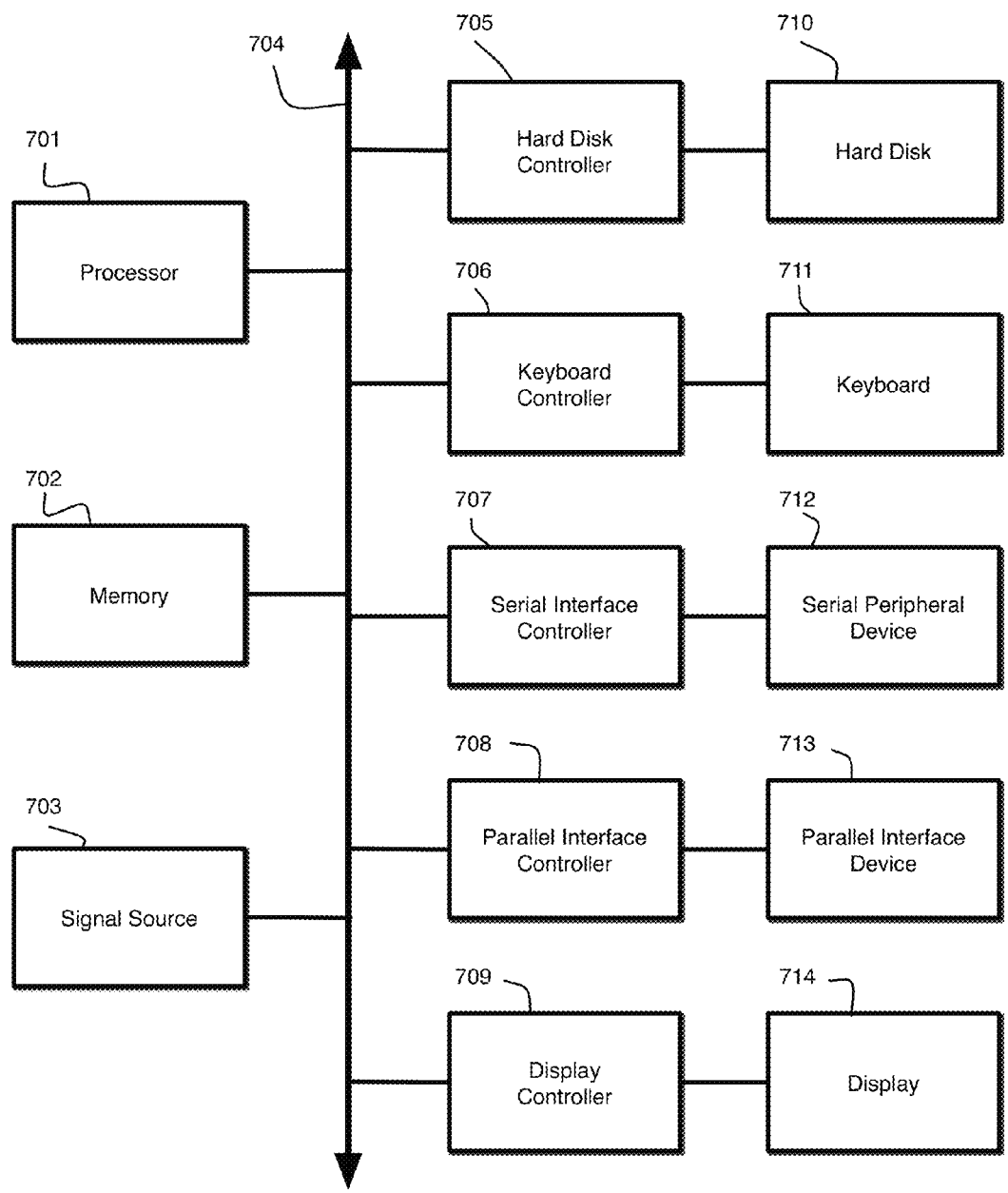
FIG. 7 is a block diagram depicting an exemplary computer system for performing a method for determining a flow distribution and heat load distribution among parallel flow and heat transfer paths in cooling assemblies according to an embodiment of the present disclosure.

For example, FIG. 7 is a block diagram depicting an exemplary computer system for determining flow and heat distribution among parallel flow and heat transfer paths according to an embodiment of the present disclosure. The computer system shown in FIG. 7 includes a processor 701, memory 702, signal source 703, system bus 704, Hard Drive (HD) controller 705, keyboard controller 706, serial interface controller 707, parallel interface controller 708, display controller 709, hard disk 710, keyboard 711, serial peripheral device 712, parallel peripheral device 713, and display 714.

In these components, the processor 701, memory 702, signal source 703, HD controller 705, keyboard controller 706, serial interface controller 707, parallel interface controller 708, display controller 709 are connected to the system bus 704. The hard disk 710 is connected to the HD controller 705. The keyboard 711 is connected to the keyboard controller 706. The serial peripheral device 712 is connected to the serial interface controller 707. The parallel peripheral device 713 is connected to the parallel interface controller 708. The display 714 is connected to the display controller 709.

In different applications, some of the components shown in FIG. 7 can be omitted. The whole system shown in FIG. 7 is controlled by computer readable instructions, which are generally stored in the hard disk 710, EPROM or other non-volatile storage such as software. The software can be downloaded from a network (not shown in the figures), stored in the hard disk 710. Alternatively, software downloaded from a network can be loaded into the memory 702 and executed by the processor 701 so as to complete the function determined by the software.

The processor 701 may be configured to perform one or more methodologies described in the present disclosure, illustrative embodiments of which are shown in the above figures and described herein. Embodiments of the present disclosure can be implemented as a routine that is stored in memory 702 and executed by the processor 701 to process the signal from the signal source 703. As such, the computer system is a general-purpose computer system that becomes a specific purpose computer system when executing the routine of the present disclosure.

Although the computer system described in FIG. 7 can support methods according to the present disclosure, this system is only one example of a computer system. Those skilled of the art should understand that other computer system designs can be used to implement the present invention.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the disclosure is not limited to those precise embodiments, and that various other changes and modifications may be made therein by one skilled in the art without departing from the scope of the appended claims.

What is claimed is:

1. A method comprising:
   obtaining calibration data for a first sub-component and a second sub-component in a heat transfer assembly, wherein said calibration data comprises at least one indication of coolant flow rate through each of said first and second sub-components for a given surface temperature delta of a respective sub-component and a given heat load into said respective sub-component;
   determining a measured heat load into each of said first and second sub-components;
   determining a measured surface temperature delta for each of said first and second sub-components;
   determining a coolant flow distribution among a first flow path in said heat transfer assembly and a second flow path in said heat transfer assembly, from said calibration data according to said measured heat load and said measured surface temperature delta of said first and second sub-components, said first flow path comprising said first sub-component and said second flow path comprising said second sub-component, wherein said first flow path and said second flow path are parallel flow paths in said heat transfer assembly;
   determining a heat load distribution in said heat transfer assembly between said first flow path and said second flow path using said calibration data said coolant flow distribution; and
   adjusting a coolant flow to at least one of said first flow path and said second flow path based on said heat load distribution.

2. The method of claim 1, wherein determining said measured surface temperature delta of said first sub-component comprises:
   determining a first surface temperature of said first sub-component at a first location along said first flow path on said inlet side of said first sub-component;
   determining a second surface temperature of said first sub-component at a second location along said first flow path of on said output side of said sub-component; and
   determining said measured surface temperature delta of said first sub-component as a difference between said first surface temperature and said second surface temperature.

3. The method of claim 1, further comprising:
   redetermining said measured surface temperature delta of said first sub-component with a heat source for a known system-level coolant flow rate; and
   determining said heat load distribution according to said calibration data, said coolant flow distribution, and said measured surface temperature delta of said first sub-component redetermined with said heat source.

4. The method of claim 1, further comprising:
   collecting a time history of said heat load distribution; and
   detecting a change in said heat transfer assembly according to said time history of said heat load distribution.

5. The method of claim 1, further comprising detecting constriction of at least one of said first flow path and said second flow path based on said heat load distribution.

6. A non-transitory computer program product for determining coolant flow rate through a sub-component according to calibration data comprising at least one indication of coolant flow rate through said sub-component for a given surface temperature delta of said sub-component and a given heat load into said sub-component, wherein said calibration data is stored by said computer program product, said computer program product comprising:
   a computer readable storage medium having computer readable program code embodied therewith, the computer readable program code comprising:
   computer readable program code configured to receive an indication of a heat load into said sub-component, said indication of said heat load into said sub-component being generating by a first means for measuring temperature disposed along a first flow path on an inlet side of said sub-component;
   computer readable program code configured to receive an indication of a surface temperature delta of said sub-component, said indication of said surface temperature delta of said sub-component being generating using said indication of said heat load into said sub-component and a second means for measuring temperature disposed along said first flow path on an output side of said sub-component;

computer readable program code configured to determine a coolant flow distribution in said first flow path comprising said sub-component from said calibration data according to said indication of said heat load and said indication of said surface temperature delta of said sub-component, wherein said coolant flow distribution of said sub-component is determined relative to at least one additional sub-component in a second flow path of said heat transfer assembly, wherein said first flow path and said second flow path are parallel flow paths in said heat transfer assembly; and computer readable program code configured to adjust a coolant flow to said first flow path using said coolant flow distribution.

7. The computer program product of claim 6, wherein said indication of said surface temperature delta of said sub-component comprises a first surface temperature of said sub-component measured at a first location along said first flow path on said inlet side of said sub-component, and a second surface temperature of said sub-component measured at a second location along said first flow path of on said output side of said sub-component, wherein indication of said surface temperature delta of said sub-component is a difference between said first surface temperature and said second surface temperature.

8. The computer program product of claim 6, wherein said computer readable program code configured to determine said coolant flow distribution of said sub-component relative to said at least one additional sub-component in said second flow path of said heat transfer assembly further comprises:

computer readable program code configured to receive an indication of a heat load into said at least one additional sub-component, said indication of said heat load into said at least one additional sub-component being generating by a second means for measuring temperature disposed along a second flow path on an inlet side of said at least one additional sub-component;

computer readable program code configured to receive an indication of a surface temperature delta of said at least one additional sub-component, said indication of said surface temperature delta of said at least one additional sub-component being generating using said indication of said heat load into said at least one additional sub-component and a second means for measuring temperature disposed along said second flow path on an output side of said at least one additional sub-component; and computer readable program code configured to determine a coolant flow distribution in said second flow path comprising said at least one additional sub-component from said calibration data according to said heat load and said surface temperature delta of said at least one additional sub-component.

9. The computer program product of claim 6, further comprising computer readable program code configured to determine a heat load distribution in said heat transfer assembly between said first flow path and said second flow path.

10. The computer program product of claim 9, further comprising:

computer readable program code configured to redetermine said measured surface temperature delta of said sub-component with a heat source for a known system-level coolant flow rate; and computer readable program code configured to determine said heat load distribution according to said calibration data, said coolant flow distribution, and said measured surface temperature delta of said sub-component redetermined with said heat source.

11. The computer program product of claim 9, further comprising:

computer readable program code configured to collect a time history of said heat load distribution; and computer readable program code configured to detect a change in said heat transfer assembly according to said time history of said heat load distribution.

12. The computer program product of claim 9, further comprising computer readable program code configured to detect constriction of at least one of said first flow path and said second flow path based on said determined heat load distribution.

* * * * *